Figure 1:
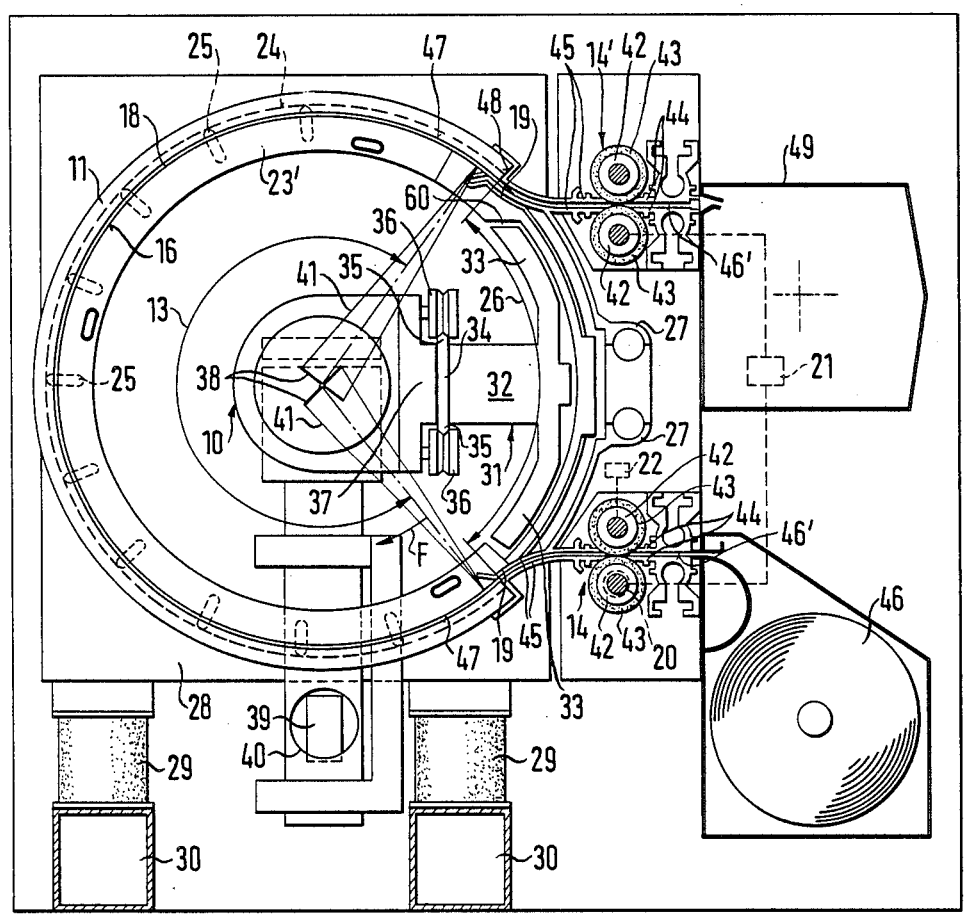

United States Patent [19]

Holthusen

[11] Patent Number: 4,712,896
[45] Date of Patent: Dec. 15, 1987

[54] PHOTOSETTING APPARATUS

[75] Inventor: Bernd Holthusen, Hamburg, Fed. Rep. of Germany

[73] Assignee: Scangraphic Dr. Boger GmbH, Fed. Rep. of Germany

[21] Appl. No.: 13,308

[22] Filed: Feb. 11, 1987

[30] Foreign Application Priority Data

Feb. 12, 1986 [DE] Fed. Rep. of Germany ....... 3604360

[51] Int. Cl.$^4$ .............................................. B41B 13/00
[52] U.S. Cl. ......................................................... 354/5
[58] Field of Search ........................................ 354/5, 6

[56] References Cited

U.S. PATENT DOCUMENTS 4,260,998  4/1981  Fukui ................................ 354/5 X Primary Examiner—Michael L. Gellner
Attorney, Agent, or Firm—Townsend & Townsend

[57] ABSTRACT

A photosetting apparatus has a segment (11) of a regular cylinder consisting of aluminium in the interior of which a sheet-like photosensitive material (12) is mounted with the photosensitive layer directed inwardly. A rotary mirror (38) arranged on a carriage is illuminated axially by a laser beam and scans the photosensitive material (12) in the circumferential direction while the carriage is advanced axially. The photosensitive material (12) is brought into contact with the inner side of the segment (11) over its full area by compression in the circumferential direction. The photosensitive material (12) is guided by two guide rings (23) which can be arranged at different spacings within the segment (11).

10 Claims, 5 Drawing Figures

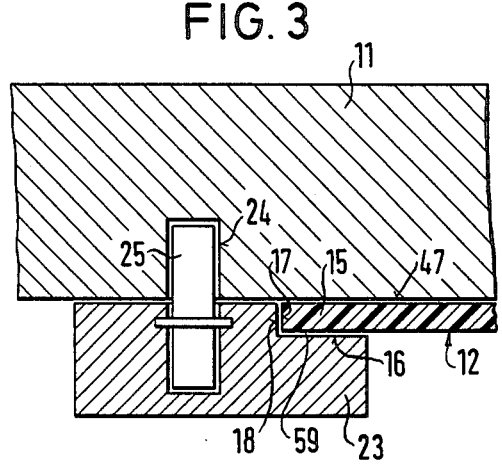
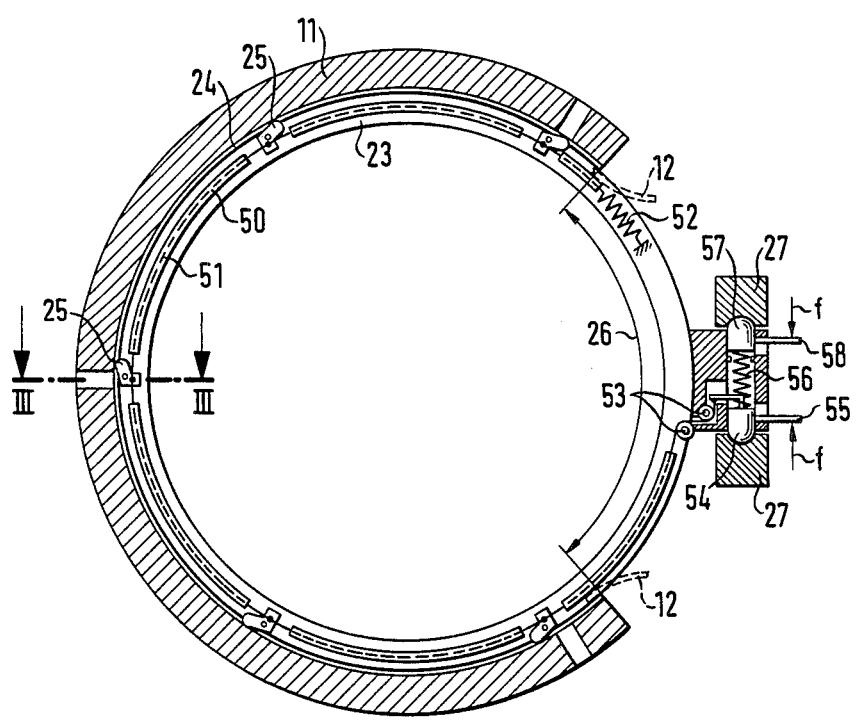

PHOTOSETTING APPARATUS

The invention relates to a photosetting apparatus comprising a segment of a regular cylinder on which a sheet-like photosensitive material can be fixed with the photosensitive layer at the inside, and a rotary mirror arranged on the axis of the segment of the regular cylinder, wherein the rotary mirror is illuminated by a laser beam modulated in accordance with the signs to be set and wherein the rotary mirror is arranged on a carriage which is controllably displaceable along the axis of the segment of the regular cylinder in such a way that the mirror generates a radial scanning beam with its origin on the rotary mirror and on the axis of the segment of the regular cylinder, with the scanning beam executing a rapid periodic scanning movement substantially in the circumferential direction of the segment of the regular cylinder, whereby an exposure region on the photosensitive material extending over the larger part of the circumference and the whole or part of the axial length of the segment of the regular cylinder is exposed with the marks to be set.

In a known photosetting apparatus of this kind (EP-OS 86 932) it is difficult to process different formats of photosensitive material due to the guidance of the photosensitive material around the inner circumference of the segment of the regular cylinder.

The object of the present invention is thus to provide a photosetting apparatus of the initially named kind with which photosensitive material of different widths can be processed in simple manner without the guidance of the photosensitive material being impaired as it is guided around the regular cylindrical segment.

In order to satisfy this object the invention provides that the guide elements and two end face abutments are formed on two guide rings which are inserted axially spaced apart into the segment of the regular cylinder, with the external diameter of the guide rings corresponding to the internal diameter of the segment of the regular cylinder, and with the rings being mounted on the segment (11) of the regular cylinder so that they are axially adjustable relative to one another. With this arrangement provision should in particular be made that one guide ring is fixedly mounted at one end face of the segment of the regular cylinder and in that the other guide ring can be inserted into the segment of the regular cylinder at different axial positions.

In this manner the two guide rings can be set at an axial spacing corresponding to the photosensitive material to be processed, with it being possible to process photosensitive materials of different widths without problem within one and the same segment of a regular cylinder, without the danger of it becoming canted.

A practical constructional embodiment is characterised in that the segment of the regular cylinder has circumferential grooves at the inside, at axial spacings corresponding to the various widths of the photosensitive material to be processed, circumferential grooves into which complementary spreading projections or locking cams can engage which are arranged distributed around the circumference of the guide ring on the latter.

In order that the guide rings can be inserted by the operator into the desired position from the side in simple and unproblematic manner a further embodiment is constructed in such a way that all the spreading projections of one guide ring are jointly actuatable from the slot side of the segment of the regular cylinder.

Furthermore, it is expedient to stabilise the guide rings during use, which can for example take place in such a way that two axially extending rails are arranged circumferentially spaced apart in the slot region of the segment of the regular cylinder; and in that at least the displaceable guide ring can be secured on the rails.

In order to bring the photosensitive material into an ideal initial position for the compressive-clamping procedure it is not only the lateral guide elements which are important, but it is also expedient for axially extending guide bodies to be provided before the start of and after the end of the exposure region of the segment of the regular cylinder, as seen in the circumferential direction, which guide the photosensitive material over its width radially from the inside and compulsorily lead it into the curvature of the inner side of the segment of the regular cylinder, so that the curvature which the photosensitive material should have in the exposure rgion is ensured at the start and at the end of the segment of the regular cylinder by compulsory guidance. It is thus important that the photosensitive material already has a shape corresponding approximately to the final regular cylindrical segment shape before the application of the circumferential compressive forces to the photosensitive material. No action of the operator is then required, but rather the final regular cylindrical position of the photosensitive material is brought about solely by the application of the compressive forces.

A particular expedient practical realisation of the thought underlying the invention consists in that the force transmitting devices are roller pairs. With this arrangement it is expedient when the input roller pair is drivable via a preferably adjustable slip clutch.

In this manner the photosensitive material can for example be drawn from a supply roll and inserted through the input roller pair, optionally past the guide bodies, into the interior of the segment of the regular cylinder until its end edge abuts the output gap of the output roller pair. In accordance with the invention the output roller pair is not driven at this stage, so that the film material is held in similar manner as if by an abutment. If the input roller pair now pushes the photosensitive material on further then the latter lies flat and in intimate contact with the inner surface of the segment of the regular cylinder while being compressed in the circumferential direction. As a result of the slip clutch that is present the compressive force is, however, restricted, so that slipping of the input roller pair on the photomaterial does not arise nor are compressive forces exerted on the photosensitive material, thus the latter is neither creased nor forcibly pressed between the rollers of the output roller pair.

A further embodiment is characterised in that the drives for the two roller pairs are synchronisable via a synchronising device. In this manner it can be ensured that after exposure of the photosensitive material the photosensitive material is transported on further by synchronous driving of the two roller pairs. A take-up reel for exposed photosensitive material is located after the output roller pair, while a supply reel is provided before the input rollers from which the unexposed film material (which is supplied in roll form) can be drawn. The photosensitive material is now advanced until an unexposed portion is again located within the regular cylindrical segment. The clamping of the photosensitive material by the output roller pair now serves for the required force transmission in the circumferential direction for the circumferential compression in the desired sense. For this purpose it is simply necessary for the drive to the output roller pair to be switched off while the drive of the input roller pair runs on further via the slip clutch.

On inserting sheet-like photosensitive material through the input roller pair along the side edge guides tilting can occur. This would be particularly unpleasant, especially with the support of the photosensitive material in accordance with the invention, because it would prevent intimate contact of the film with the segment of the regular cylinder. In order to achieve a fully aligned distortion-free and non-twisted drawing of the photosensitive material into the segment of the regular cylinder, a further embodiment is characterised in that the two rollers of the input roller pair are separable by a roller separating device at predetermined time intervals during the insertion of the photosensitive material into the segment of the regular cylinder. The photosensitive material is thus, in particular during the first insertion, always transported by a certain moment, whereupon the rollers are then separated. Should natural tensions have previously occured then an elastic relaxation takes place at the side edge guides on separation of the rollers, i.e. the photosensitive or film material is automatically aligned in the desired circumferential direction. Thereafter it is fed on a bit further whereupon the rollers are once again separated for a short period of time for self-alignment of the photosensitive material and so on.

Furthermore, it is advantageous if the segment of the regular cylinder consists of an aluminium alloy.

Figure 4:
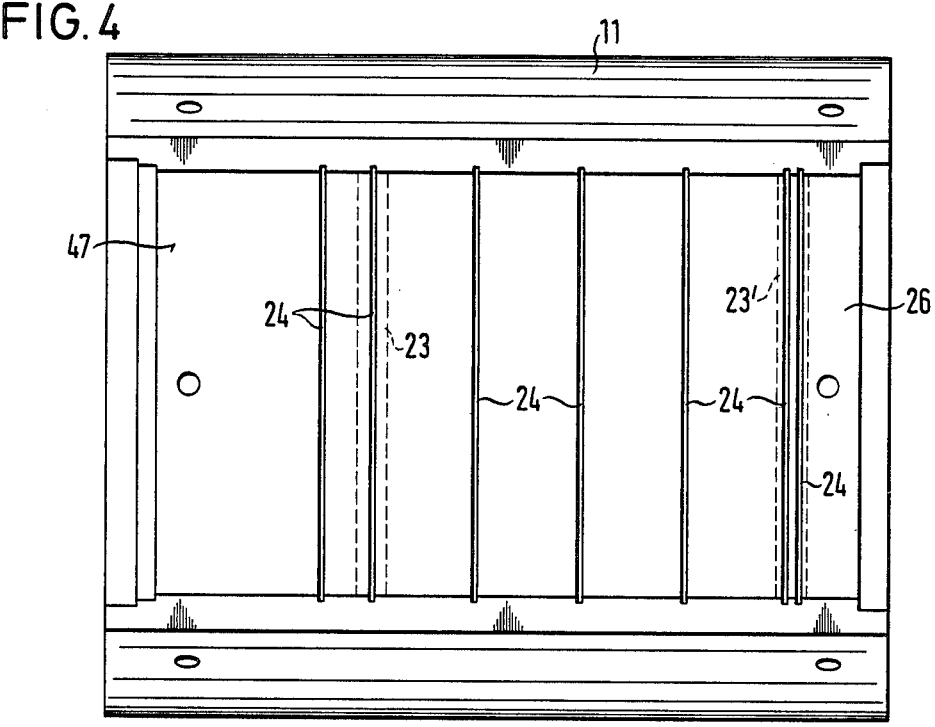
Figure 5:
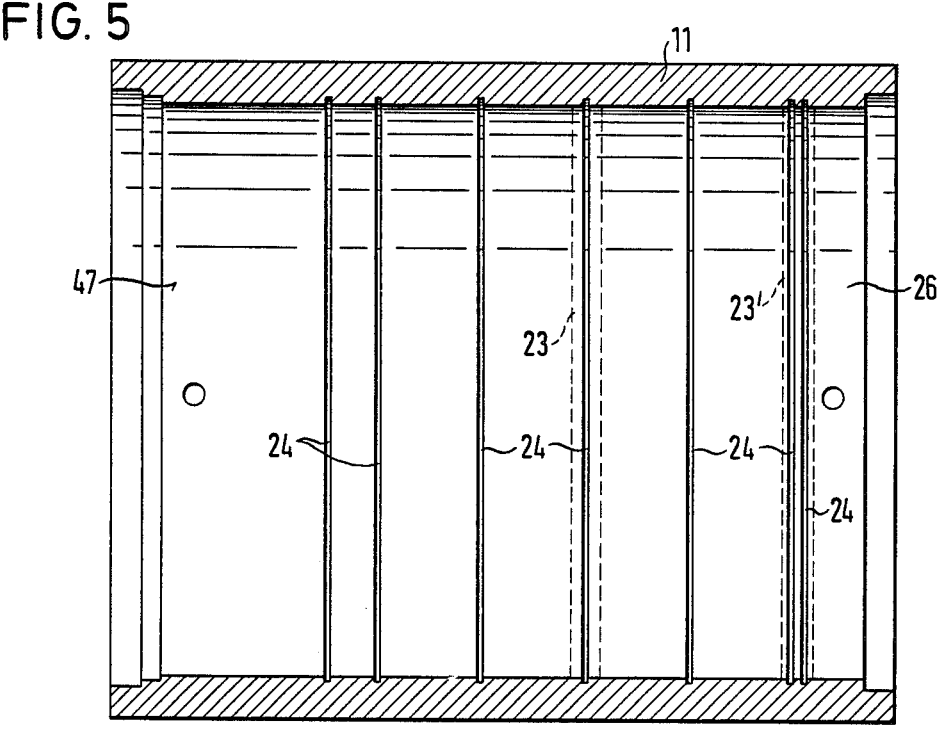

The invention will now be described by way of example and with reference to the drawings which show:

FIG. 1 a partly sectioned end view of a photosetting apparatus in accordance with the invention, FIG. 2 an end view analogous to that of FIG. 1, wherein, however, apart from the segment of the regular cylinder, only the adjustable guide ring and its actuation and arrangement are illustrated, and all remaining parts are omitted for the sake of simplicity, FIG. 3 an enlarged sectional view on the line III—III of FIG. 2, FIG. 4 a view of the segment of the regular cylinder used in accordance with the invention as seen from the slot side, and FIG. 5 a vertical central longitudinal section of the segment of the regular cylinder used in the photosetting apparatus of the invention.

As seen in FIG. 1 the photosetting apparatus of the invention has two plate-like base bodies 28 of cast material which are arranged axially spaced apart and which are mounted at their lower sides on a frame 30 (not shown in detail) via buffers 29 which serve for vibration damping.

A segment 11 of a regular cylinder of cast aluminium is secured to the confronting end faces of the base bodies 28 and has a diameter of for example 30 cm which is so large that a laser scanning arrangement 10 can be arranged in its interior. The laser scanning arrangement is intended to expose photosensitive material 12 laid around the segment 11 from the inside, which is however only indicated in FIGS. 2 and 3.

The two base bodies 28 are mechanically rigidly connected together by a transverse beam 31 which extends perpendicular to the plane of the drawing of FIG. 1 and which has, in accordance with FIG. 1, a central beam part 32 and flanges 33 which extend from the central beam part 32 essentially in the circumferential direction of the segment. The flanges 33 and the beam part 32 lie within the slot region 26 of the segment 11 and indeed substantially concentrically to the cylindrical segment 11. The detail of the arrangement of the components 28 to 38 can be seen from German Offenlegungsschrift DE-OS No. 35 31 458.

In accordance with FIG. 1 a strip rail 34 with its flat sides disposed vertically is secured, and preferably screwed, to the beam part 32 of the cross beam 31 and has roof-like rail surfaces 35 at its upper and lower edges. Running wheels 36 having complementary shaped grooves engage with the roof-like rail surfaces pairwise from above and below with a fitted seat. The running wheels 36 are arranged on a carriage 37 which extends substantially horizontally from the cross beam 31 into the interior of the segment 11. Along which a rotary mirror 38 is mounted on the carriage. The alignment and driving of the rotary mirror are as described in German Offenlegungsschrift No. 35 31 458. The rotary mirror is thus located on the axis of the segment 11 of the regular cylinder and subtends an angle of 45° with this axis. The axis of rotation coincides with the axis of the segment of the regular cylinder.

The rotary mirror 38 is only schematically illustrated in FIG. 1.

The rotary mirror 38 is illuminated axially by a laser beam which extends along the cylinder axis and which originates from a laser 39 arranged beneath the segment 11. Laser 39 is merely indicated in FIG. 1. Between the laser and rotary mirror there are also located a laser modulator 40, two plane deflecting mirrors (not shown) which deflect the laser beam into the interior of the segment 1 and also an image forming optical system (not shown) which ensures that the scanning light bead generated on the inner periphery of the segment 11 has the desired sharpness. The scanning light beams 41 are indicated in FIG. 1 at 41. The scanning cycle starts in the position indicated by the lower scanning light beam. Subsequently the scanning light beam 41 swings from the position illustrated at the bottom in the direction of the arrow F around the segment 11 of the regular cylinder until it reaches the end position shown at the top. In this way an exposure region 13 extending over 270° is provided. At the same time the carriage 37 is continuously moved on in the axial direction so that the laser light beam 41 as a whole executes a linewise circumferential scan of the photosensitive material arranged on the inner side of the segment 11.

The segment 11 preferably consists of a cast aluminium alloy and extends horizontally. A slot region 26 extending over approximately 90° is located at one side of the segment 11 of the regular cylinder and the cross beam 31 is provided within the slot region 26B but is displaced radially somewhat towards the inside.

A draw-in roller pair 14, the axes of which extend parallel to the axis of the segment 11 of the regular cylinder is located at the level of the lower part of the slot region 26 directly in front of the segment 11. The roller pair 14 consists of two bars 42 which are arranged above one another and which extend over practically the full axial length of the segment 11 of the regular cylinder.

Rollers 43 of resilient material such as rubber are concentrically mounted axially spaced apart on the bars 42. The rolls 43 engage through slots in the guide surfaces 44 and contact one another between the guide surfaces 44. The guide surfaces 44 define a horizontal flat guide track 46' into which the sheet-like photosensitive material is drawn from a supply reel 46 through the draw-in roller pair 14.

The guide track 46 merges tangentially into the circumference of the inner surface 46 of the segment 11 of the regular cylinder via further guide surfaces 45 which are gently curved in a downward direction. It is important that the radially inner guide surface 45 as seen from the segment 11 of the regular cylinder extends up to a guide body 19 which is arranged at a small distance from the inner surface 47 and which has a short portion in the peripheral direction which overlaps the segment 11 of the regular cylinder over a short distance and extends parallel to the inner surface 41—starting from the edge of the cylinder segment 11 bounding the lower end of the slot region 26. In this way the photosensitive material supplied from the draw-in roller pair 14 through the guide track 46' is necessarily fed tangentially to the inner surface 47 of the segment 11 of the regular cylinder.

The upper bar 42 of the roller pair 14 is driven in a rotating motion via a slip clutch with adjustable slipping force while the upper roller or rubber rolls 43 arranged on the bar 42 preferably loosely contact the rubber rolls 43 of the lower bar 42 under their own weight. The clamping force is thus determined by the weight of the upper roller.

In the region of the upper end edge 48 of the segment 11 of the regular cylinder there is a completely complementary arrangement of a guide body 19 and of guide surfaces 44, 45 with a guide track 46' located therebetween.

The guide body 19 fractionally overlaps the end region of the segment 11 of the regular cylinder and has a small radial spacing from its inner surface 47 towards the inside. The guide body 19 likewise extends in the circumferential direction of the inner surface 47. It then joins, in the region of the guide surfaces which extend spaced apart parallel to one another a region of opposite curvature to that of the segment 11 of the regular cylinder, with this region merging into the horizontal guide track 46'. This guide track 46' is formed by the guide surfaces 44 which again have slots arranged spaced apart in the axial direction through which rubber rolls 43 engage from axially disposed rods 42. In this way an output roller pair 14' is formed in the upper region of the segment 11 of the regular cylinder.

The upper guide track 46' opens into a cassette 49 in which a take-up reel (not shown) for exposed photosensitive material is located.

As seen in FIGS. 3 to 5 the segment 11 of the regular cylinder has axially spaced apart peripheral grooves 24 in its inner surface 47, with the arrangement of these grooves depending on the widths of the film material which are to be processed in the photosetting apparatus. At the extreme right in FIGS. 4 and 5 a guide ring 23' is arranged in the peripheral groove 24 and a displaceable guide ring 23 is arranged further to the left. The guide rings 23, 23' are only indicated in broken lines in FIGS. 4 and 5, with the displaceable guide ring 23 in FIG. 4 being shown in the second circumferential groove 24 from the left and in FIG. 5 in the fourth peripheral groove from the left. The precise arrangement and the function of the guide rings 23, 23' will now be described in the following with reference to FIGS. 1 to 3.

As seen in FIGS. 1 and 2 the guide rings 23' have an external diameter which substantially corresponds to the internal diameter of the segment 11 of the regular cylinder, so that the guide rings 23, 23' can be inserted axially into the interior of the segment 11 of the regular cylinder without jamming. The guide rings 23, 23' have a number of spreading projections or locking cams 25 distributed around their periphery. These cams can be actuated by hand so that they either project radially outwardly from the guide rings 23, in order to engage in the circumferential grooves 24, or are drawn back into the interior of the guide rings 23. FIG. 2 shows by way of example that the locking cams 25 are formed as pivoted levers with an axis of rotation extending parallel to the ring axis. In the illustrated pivotal position the locking cams or spreading projections 25 lie within the peripheral grooves 24 (see also FIG. 3) whereas on pivoting them in the clock-wise sense in FIG. 2 the spreading projections 25 move radially inwardly out of the peripheral grooves 24, so that the guide ring 23 can then be axially displaced to another circumferential groove 24.

The adjustment of the spreading projections 25 can for example take place in accordance with FIG. 2, in that all the pivoted levers are connected to one another by a draw member 51 which is laid in a channel 50 around a part of the guide ring 23 and which is connected at one end via a tension spring 52 to the ring and at the other end to a draw member 54 actuated by hand, optionally after being deflected over rollers 53. The draw member has a forwardly projecting handle 55. If a force is exerted on this handle in the direction of the arrow f then the draw member is displaced against the force of the spring in the counter-clockwise direction in FIG. 1 whereupon all the spreading projections 25 are so pivoted that they move out of engagement with the circumferential 24. If the handle 55 is released again then the spring 52 once again pivots the spreading projections 25 radially outwardly by exerting a corresponding tensile force on the draw member 51.

The actuating member 54 is biased by a spring 56 into its lower initial position in which it lies in a recess of a rail 27 which extends in front of the slot region 26 parallel to the axis of the segment level of the regular cylinder and which is fixed to the housing. A second rail 27 and a corresponding layout is provided at a distance above the rail 27 and a clamping member 57 of similar construction to the actuating member 54 which likewise acts on by the spring 56 engages in the lower recess in the second rail 27. As a result of the tension of the spring 56 the members 54, 57 are biased away from one another against the recesses of the two rails 27 lying above one another, whereby the ring 27 is fixed to the housing in a problem-free manner.

The upper clamping member 57 also has a handle 58 which projects forwardly and which can also be grasped by the fingers of an operator in the same way as the handle 55. By applying a force f downwardly the clamping member 57 can be moved out of engagement with the rail 27 which is necessary for axial displacement of the ring 23.

When the operator grasps the two handles 55, 58 with two fingers and moves them towards one another then the members 54, 57 can simultaneously be moved out of engagement with the rails 27 and the spreading projections 25 moved out of the circumferential grooves 24. The guide ring 23 can now be displaced axially to the desired circumferential groove 24 whereupon, on releasing the handles 55, 58, the springs 52, 56 again move the spreading projections 25 into the peripheral grooves 24 and the members 54, 57 come into contact with the rails 27.

Two closely adjacent peripheral grooves 24 are shown at the extreme right in FIGS. 4 and 5 and the guide ring 23' can be respectively arranged and latched into each of these grooves. In FIGS. 4 and 5 the end guide ring 23' is reproduced in an intermediate position between the two right hand circumferential grooves 24. In actual fact it only latches into one of the circumferential grooves 24 if it is further displaced towards the right or the left in order in this way to take account of two fractionally different sizes for the film material that is used.

As seen in FIG. 3 the guide ring 23 has a rectangular recess 59 at the side facing the photosensitive material 12 close to the inner surface 57 of the segment 11 of the regular cylinder. This recess forms a guide element 16 at its radially inner side a guide element 16 spaced from the peripheral surface 47 and, at its axial side, an end face abutment 18 for the photosensitive material 11. In this way the one side edge 15 of the photosensitive material (FIG. 3) is guided without problem in the axial and radially inward directions. The guide ring 23' which is fixedly mounted at the right hand end of the segment 11 of the regular cylinder (FIGS. 4 and 5) is of complementary construction to the guide ring 23 of FIG. 3 so that it also supports the other non-illustrated side edge of the photosensitive material 12 in analogous manner.

As seen in FIG. 1 the guide rings 23, 23' have a radially outwardly projecting recess 60 (i.e. a radially inwardly facing recess), so that in this region they can be moved without problem behind and past the cross beam 31.

The spreading projections 25 are only schematically illustrated in FIG. 1. Also the actuating and clamping mechanism between the rails 27 is only indicated in FIG. 1. The precise representation of the example can be seen from FIG. 2.

The manner of operation of the described photosetting apparatus is as follows:

At the start of the operation the sheet-like photosensitive material drawn from the supply reel 46 is fed between the guide surfaces 44 up to the draw-in roller pair 14. On driving the latter the photosensitive material, which is not shown in FIG. 1, is now drawn in and along the guide track 46', first of all in a slightly downwardly curved path up to the guide body 19 which gives the photosensitive material a course directed practically in the circumferential direction.

Electromagnets which are not shown are preferably provided above the upper roller of the roller pair 14 by means of which this roller can be lifted from time to time to insert the film material up to the guide surfaces 16, 18.

The guide rings 23, 23' are cut-away at their confronting end faces within the slot region 26 and somewhat beyond this in the circumferential direction so that the radially inner guide elements 16 first start directly following the guide body 19 and aligned therewith in the circumferential direction. In this way one avoids the axial displacement of the guide rings 23, 23' being hindered by the guide bodies 19. A corresponding cut-out need not however be provided for the fixedly mounted guide ring 23'.

It is in any event important that the material emerging from the guide body 19 and advanced by the input roller pair 40' enters into the slot between the guide elements 16 and the inner surface of the circular segment 11. The side edges 17 are guided during this by the end face abutments 18 of the guide rings 23, 23' while the side edges 15 are guided in the radial direction by the guide elements 16 and the inner surface 47.

In this way it is ensured that the draw-in roller pair 14 guides the photosensitive material along the inner surface 47 of the circular segment 11 until it again reaches the radially inner guide body 19 at the top and is subsequently fed by the guide surface 45 which is curved in the opposite direction up to the output roller pair 14'. As this pair is initially not driven the roll gap of the output roller pair 14 forms an abutment for the advanced photosensitive material. As a result of the continued driving of the draw-in rollers 14 a compression of the photosensitive material now occurs which results in the latter coming into intimate contact over its full surface with the inner surface 47 of the segment 11 of the regular cylinder. The force necessary for this is restricted by the slip clutch 20 at the input roller pair 14. As soon as the compressive force has reached the value required for problemfree contact of the photosensitive material 12 against the inner surface 47 the coupling 20 slips and the photosensitive material 11 is now fixed without problem in the position in which it adopts the shape of a regular cylinder, so that the exposure by the laser beam 41 can now be effected. The laser light beam 41 periodically scans the photosensitive material 12 in the circumferential direction with linewise exposure being effected by simultaneous axial feed of the carriage 37. The laser beam is modulated in the desired manner so that a particular picture, for example a desired arrangement of letters, can be achieved on the photosensitive material.

As soon as the photosensitive material has been exposed in the desired manner the two roller pairs 14, 14' which are connected together by a synchronising device 21 are synchronously driven. The exposed part of the photosensitive material is now wound up in the cassette 49 while unexposed photosensitive material is brought from the supply reel 46 to the inner surface 47 of the segment 11 of the regular cylinder. The roller pair 14' is now switched off while the roller pair 14 remains switched on, the photosensitive material newly introduced into the segment 11 of the regular cylinder is compressed in the desired manner for troublefree contact until the next exposure has taken place. The process can then be repeated each time in the desired manner.

If now a photosensitive material with a different width is to be processed then it is only necessary to axially displace the axially displaceable guide ring 23 in the previously described manner by moving the handles 55, 58 towards one another in FIG. 2 and to release them again at the position of the desired circumferential groove 24.

As seen in FIG. 1 the upper roller of the input roller pair 14 is connected with a schematically indicated roller separating device 22 which, on inserting a film sheet with a free front edge, periodically lifts from the lower roller whereupon the photosensitive material, which is now located to a greater or lesser degree within the segment 11, automatically displaces itself symmetrically between the confronting end face abutments 18 (FIG. 3) if lateral tilting should have occurred during the preceding infeed step. The roller separating device 22 finally lowers the upper roller again onto the lower roller so that the feed of photosensitive material can be continued. Through this periodic separation of the rollers of the input roller pair 14 it is possible to ensure a fully tilt-free drawing in of the photosensitive material into the segment 11 of the regular cylinder, which is important for a trouble-free execution of the subsequent compression procedure.

The ends of the bars 42 should be arranged in vertical slot guides which merely permit a vertical movement and rotation of the upper rollers so that the upper rollers of the roller pairs 14, 14' are guided in trouble-free manner.

Of the film material 12 FIG. 2 shows in broken lines only a short piece at the entry and a short piece at the exit.

I claim:

1. Photosetting apparatus comprising a segment of a regular cylinder on which a sheet-like photosensitive material can be fixed with the photosensitive layer at the inside, and a rotary mirror arranged on the axis of the segment of the regular cylinder, wherein the rotary mirror is illuminated by a laser beam modulated in accordance with the signs to be set and wherein the rotary mirror is arranged on a carriage which is controllably displaceable along the axis of the segment of the regular cylinder in such a way that the mirror generates a radial scanning beam with its origin on the rotary mirror and on the axis of the segment of the regular cylinder, with the scanning beam executing a rapid periodic scanning movement substantially in the circumferential direction of the segment of the regular cylinder, whereby an exposure region on the photosensitive material extending over the larger part of the circumference and the whole or part of the axial length of the segment of the regular cylinder is exposed with the marks to be set, wherein the photosensitive material can be laid against the cylindrical inner side of the segment of the regular cylinder, which preferably consists of light impermeable material, by the provision before and after the exposure region of the segment of the regular cylinder, as seen in the circumferential direction, of respective force transmitting devices which exert a restricted compressive force on the photosensitive material; wherein guide elements also engage the side edges of the photosensitive material radially from the interior; and wherein an end face abutment engages at least one side edge of the photosensitive material, characterised in that the guide elements (16) and two end face abutments (18) are formed on two guide rings (23, 23') which are inserted axially spaced apart into the segment (11) of the regular cylinder, with the external diameter of the guide rings corresponding to the internal diameter of the segment (11) of the regular cylinder, and with the rings being mounted on the segment (11) of the regular cylinder so that they are axially adjustable relative to one another.

2. Photosetting apparatus in accordance with claim 1, characterised in that one guide ring (23') is fixedly mounted at one end face of the segment (11) of the regular cylinder and in that the other guide ring (23) can be inserted into the segment (11) of the regular cylinder at different axial positions.

3. Photosetting apparatus in accordance with claim 1, characterised in that the segment (11) of the regular cylinder has circumferential grooves (24) at the inside, at axial spacings corresponding to the various widths of the photosensitive material (12) to be processed, into which complementary spreading projections (25) can engage which are arranged distributed around the circumference of the guide ring (23) on the latter.

4. Photosetting apparatus in accordance with claim 3, characterised in that all spreading projections (25) of one guide ring (23) can be jointly actuated from the slot side of the segment (11) of the regular cylinder.

5. Photosetting apparatus in accordance with claim 1, characterised in that two axially extending rails (27) which are circumferentially spaced apart are arranged in the slot region (26) of the segment (11) of the regular cylinder; and in that at least the displaceable guide ring (23) can be secured on the rails (27).

6. Photosetting apparatus in accordance with claim 1, characterised in that axially extending guide bodies (19) are provided before the start of and after the end of the exposure region (13) of the segment (11) of the regular cylinder, as seen in the circumferential direction, which guide the photosensitive material over its width radially from the inside and compulsorily transfer or lead it into the curvature of the inner side of the segment (11) of the regular cylinder, so that the curvature which the photosensitive material (12) should have in the exposure region (13) is ensured at the start and at the end of the segment (11) of the regular cylinder by compulsory guidance.

7. Photosetting apparatus in accordance with claim 1, characterised in that the force transmitting devices are roller pairs (14, 14'), the axes of which extend parallel to the cylinder axis.

8. Photosetting apparatus in accordance with claim 7, characterised in that the input roller pair (14) is drivable via a preferably adjustable slip clutch (20).

9. Photosetting apparatus in accordance with claim 7, characterised in that the drives of the two roller pairs (14, 14') are synchronisable via a synchronising device (21).

10. Photosetting apparatus in accordance with claim 7, characterised in that the two rollers of the input roller pair (14) are separable by a roller separating device (22) at predetermined time intervals during the insertion of the photosensitive material (12) into the segment (11) of the regular cylinder.

* * * * *